United States Patent
Parsons

(10) Patent No.: US 12,092,025 B2
(45) Date of Patent: Sep. 17, 2024

(54) TURBINE ENGINE EXHAUST GAS TEMPERATURE SENSOR

(71) Applicant: Unison Industries, LLC, Jacksonville, FL (US)

(72) Inventor: John P. Parsons, Afton, NY (US)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 17/837,102

(22) Filed: Jun. 10, 2022

(65) Prior Publication Data

US 2023/0193821 A1 Jun. 22, 2023

Related U.S. Application Data

(60) Provisional application No. 63/292,735, filed on Dec. 22, 2021.

(51) Int. Cl.
| | | |
|---|---|---|
| F01D 17/02 | (2006.01) | |
| F02C 7/00 | (2006.01) | |
| G01K 1/08 | (2021.01) | |
| G01K 13/024 | (2021.01) | |

(52) U.S. Cl.
CPC .............. *F02C 7/00* (2013.01); *F01D 17/02* (2013.01); *G01K 1/08* (2013.01); *G01K 13/024* (2021.01); *F05D 2220/32* (2013.01); *F05D 2260/80* (2013.01)

(58) Field of Classification Search
CPC ........ G01K 13/02; G01K 13/024; G01K 1/08; G01K 1/12; G01K 1/14; G01K 1/16; F01D 17/02; F01D 17/085; F05D 2260/80
See application file for complete search history.

(56) References Cited

U.S. PATENT DOCUMENTS

| | | | | |
|---|---|---|---|---|
| 4,467,137 | A | * | 8/1984 | Jonathan ............ H02G 15/1806 174/DIG. 8 |
| 5,080,496 | A | * | 1/1992 | Keim ........................ F02C 9/28 374/E7.042 |
| 9,103,731 | B2 | * | 8/2015 | DeFrietas ................ G01K 1/12 |
| 9,442,022 | B2 | * | 9/2016 | Parsons ................. G01K 13/02 |
| 9,689,755 | B2 | | 6/2017 | Gmach et al. |
| 9,970,824 | B2 | | 5/2018 | Cheung et al. |
| 10,197,454 | B2 | * | 2/2019 | Jackson ................ G01K 13/02 |
| 10,408,683 | B2 | | 9/2019 | Glasheen et al. |
| 10,578,637 | B2 | | 3/2020 | Matheis et al. |
| 11,105,691 | B2 | | 8/2021 | Gordon et al. |

(Continued)

FOREIGN PATENT DOCUMENTS

| | | | |
|---|---|---|---|
| EP | 0186609 | A2 | 7/1986 |
| EP | 0907004 | A2 | 4/1999 |

(Continued)

*Primary Examiner* — David E Sosnowski
*Assistant Examiner* — Maxime M Adjagbe
(74) *Attorney, Agent, or Firm* — McGarry Bair PC

(57) ABSTRACT

A gas turbine engine can include a compressor section, a combustion section, and a turbine section in serial flow arrangement. At least one of the combustion section or turbine section can have an exhaust gas passage. The turbine engine can also include an exhaust gas temperature sensor with a housing having an elongated probe portion. The elongated probe portion can have an outer wall bounding an interior. A temperature probe can be provided within the housing.

19 Claims, 6 Drawing Sheets

(56) References Cited

U.S. PATENT DOCUMENTS

| | | | |
|---|---|---|---|
| 2012/0216608 A1 | 8/2012 | Schleif et al. | |
| 2014/0182292 A1 | 7/2014 | Hudon et al. | |
| 2015/0063414 A1* | 3/2015 | Wigen | G01K 13/028 374/138 |
| 2018/0372557 A1 | 12/2018 | Shaughnessy | |
| 2019/0101019 A1 | 4/2019 | Haffner et al. | |

FOREIGN PATENT DOCUMENTS

| | | |
|---|---|---|
| FR | 3084160 A1 | 1/2020 |
| GB | 734702 A | 8/1955 |
| GB | 759268 A | 10/1956 |
| GB | 1081457 A | 8/1967 |

* cited by examiner

TURBINE ENGINE EXHAUST GAS TEMPERATURE SENSOR

CROSS-REFERENCE TO RELATED APPLICATION(S)

This application claims the benefit of U.S. Provisional Application No. 63/292,735, filed Dec. 22, 2021, which is incorporated herein by reference in its entirety.

TECHNICAL FIELD

The disclosure generally relates to temperature sensors, and more particularly, to exhaust gas temperature sensors in turbine engines.

BACKGROUND

Turbine engines, and particularly gas turbine engines, also known as combustion turbine engines, are rotary engines that extract energy from a flow of combusted gases passing through the engine onto a multitude of turbine blades. Gas turbine engines have been used for land and nautical locomotion and power generation, and are commonly used for aeronautical applications, such as for propulsion of aircraft.

During operation of the gas turbine engines, fuel is combusted to provide rotational energy and thrust through a set of turbines. In order to ensure or validate the gas turbine engine is operating as desired, a temperature sensor probe can be included in the engine wherein it is exposed to the exhaust gases. The temperature sensor can measure the temperature of the exhaust gas stream, and can provide a signal or measurement value to another system, such as an engine control system. The temperature sensor output can be used to, for example, protect downstream engine components from temperatures that would exceed their design capabilities.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
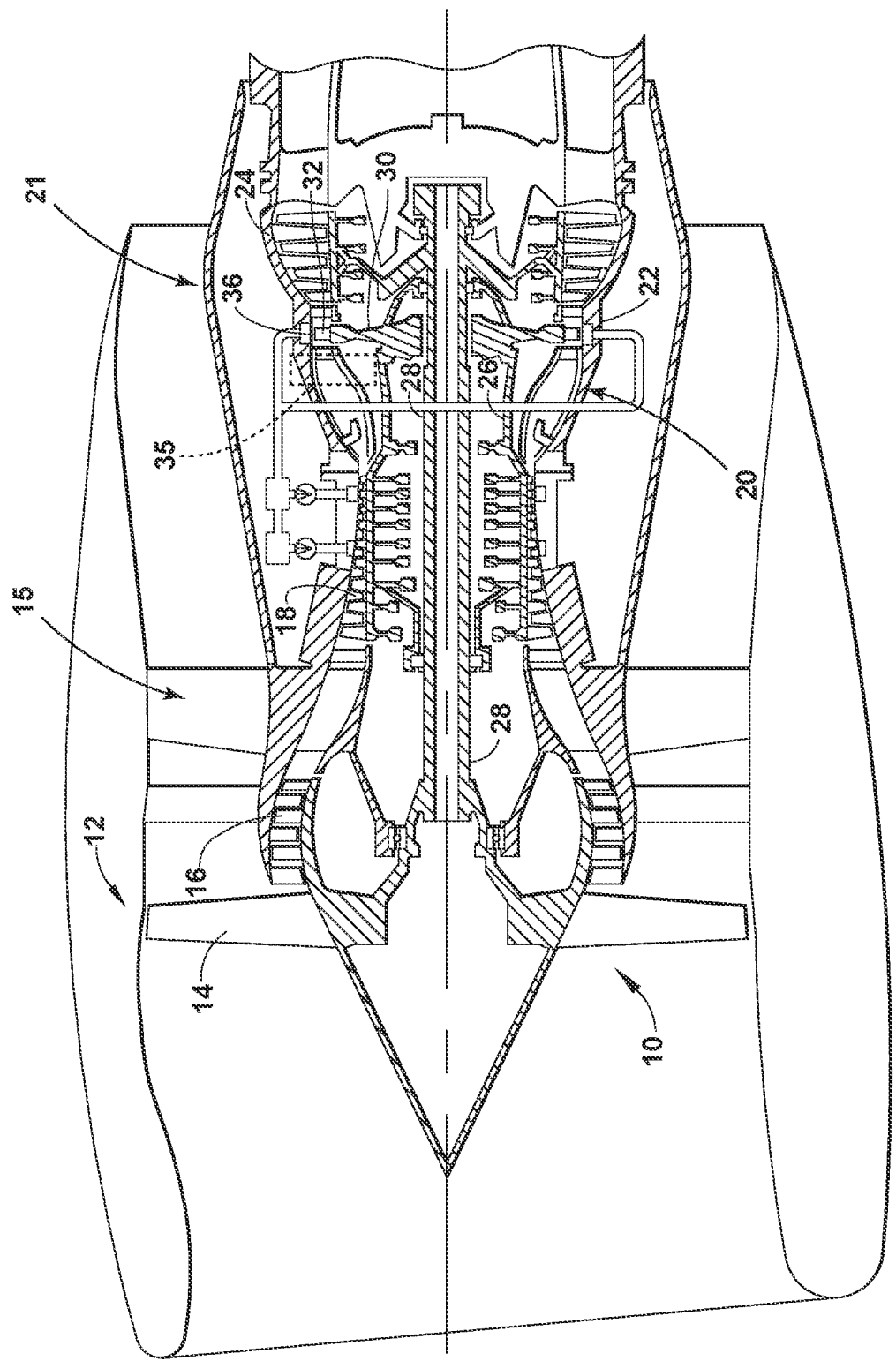
FIG. 1 is a cross-sectional view of a gas turbine engine in accordance with various aspects described herein.

The described embodiments of the present disclosure are directed to a temperature sensor and probe assembly. For purposes of illustration, one exemplary environment within which the temperature sensor can be utilized will be described in the form of a turbine engine. Such a turbine engine can be in the form of a gas turbine engine, a turboprop engine, a turboshaft engine, a turbofan engine, or an open rotor engine in non-limiting examples. It will be understood, however, that aspects of the disclosure described herein are not so limited and may have general applicability. For example, the disclosure can have applicability for a temperature sensor in other engines or vehicles, and may be used to provide benefits in industrial, commercial, and residential applications.

Exhaust gas temperature (EGT) sensors typically include a housing surrounding a thermocouple element and configured to extend or project into a combustion gas flow for measurement of temperatures in the flow. EGT sensors immersed within the combustion gas flow, produce drag, aerodynamic blockage or other flow disturbances in the combustion gases downstream of the EGT sensor due to the fluid movement past the sensor housing. Such fluid movements can generate both component wear on the EGT sensor as well as fluid vortices, shedding, turbulent flow, or other flow disturbances in the combustion gases downstream of the EGT sensor. Such flow disturbances can remain in the flow and encounter downstream engine elements in the high pressure turbine, which can negatively effect engine performance. The immersed EGT sensor will also experience aerodynamic drag as a result of being immersed with combustion gas flow, generating strain and stresses within the housing, these stresses may produce creep, plastic deformation, crack initiation, or crack propagation within the housing of the EGT.

In addition, EGT sensors are exposed to hot combustion gases, which can be in the range of 500° F. to 2500° F. (260° C. to 1370° C.) or even higher in some examples. Such sensors may be required to protect components to allow for accurate measurement of combustion gas flows while withstanding the hot environment over repeated use. Positioning an EGT sensor as close as possible to the combustor can provide for more accurate combustion gas temperature measurements; however, temperatures within or directly adjacent the combustor may be higher than the sensor materials can withstand.

Aspects of the disclosure provide for an improved aerodynamic EGT sensor capable of operating within the high-temperature turbine engine combustor environment with decreased effects on downstream fluid flows, increased component lifetimes, and decreased part stresses. Turbine engines with the improved EGT sensor described herein can have an improved engine performance and higher engine efficiency compared to engines using traditional EGT sensors.

As used herein, the term "set" or a "set" of elements can be any number of elements, including only one. Additionally, as used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), combinations thereof, and the like.

Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types.

In another non-limiting example, a controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein.

Additionally, as used herein, elements being "electrically connected," "electrically coupled," or "in signal communication" can include an electric transmission or signal being sent, received, or communicated to or from such connected or coupled elements. Furthermore, such electrical connections or couplings can include a wired or wireless connection, or a combination thereof.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor as defined above, and the controller module or processor can perform processing on the value to determine a representative value or an electrical characteristic representative of said value.

All directional references (e.g., radial, axial, upper, lower, upward, downward, left, right, lateral, front, back, top, bottom, above, below, vertical, horizontal, clockwise, counterclockwise, fore, aft) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 includes, in downstream serial flow relationship, a fan section 12 including a fan 14, a compressor section 15 including a booster or low pressure (LP) compressor 16 and a high pressure (HP) compressor 18, a combustion section 20, and a turbine section 21 including an HP turbine 22 and a LP turbine 24. A HP shaft or spool 26 drivingly connects the HP turbine 22 to the HP compressor 18 and a LP shaft or spool 28 drivingly connects the LP turbine 24 to the LP compressor 16 and the fan 14. The HP turbine 22 includes an HP turbine rotor 30 having turbine blades 32 mounted at a periphery of the HP turbine rotor 30.

The gas turbine engine 10 can further include an exhaust gas temperature (EGT) sensor 35, illustrated in schematic outline. In the example of FIG. 1 the EGT sensor 35 is configured as an exhaust gas temperature sensor and positioned within the combustion section 20 though this need not be the case. The EGT sensor 35 can also be positioned upstream or downstream of the combustion section 20. In some examples, multiple EGT sensors 35 can be arranged about the engine 10, for instance, spaced about a circumference of the engine 10.

The gas turbine engine 10 can operate such that the rotation of the fan 14 draws air into the HP compressor 18. The HP compressor 18 compresses the air and delivers the compressed air to the combustion section 20. In the combustion section 20, the compressed air can be mixed with fuel, and the air/fuel mixture is ignited, expanding and generating high temperature combustion exhaust gases 34 (not shown in FIG. 1). The combustion exhaust gases 34 flow downstream, passing the EGT sensor 35 and through the HP and LP turbines 22, 24, generating the mechanical force for driving the respective HP and LP spools 26, 28. Finally, the exhaust gases 34 can be expelled from the rear of the engine 10.

Figure 2:
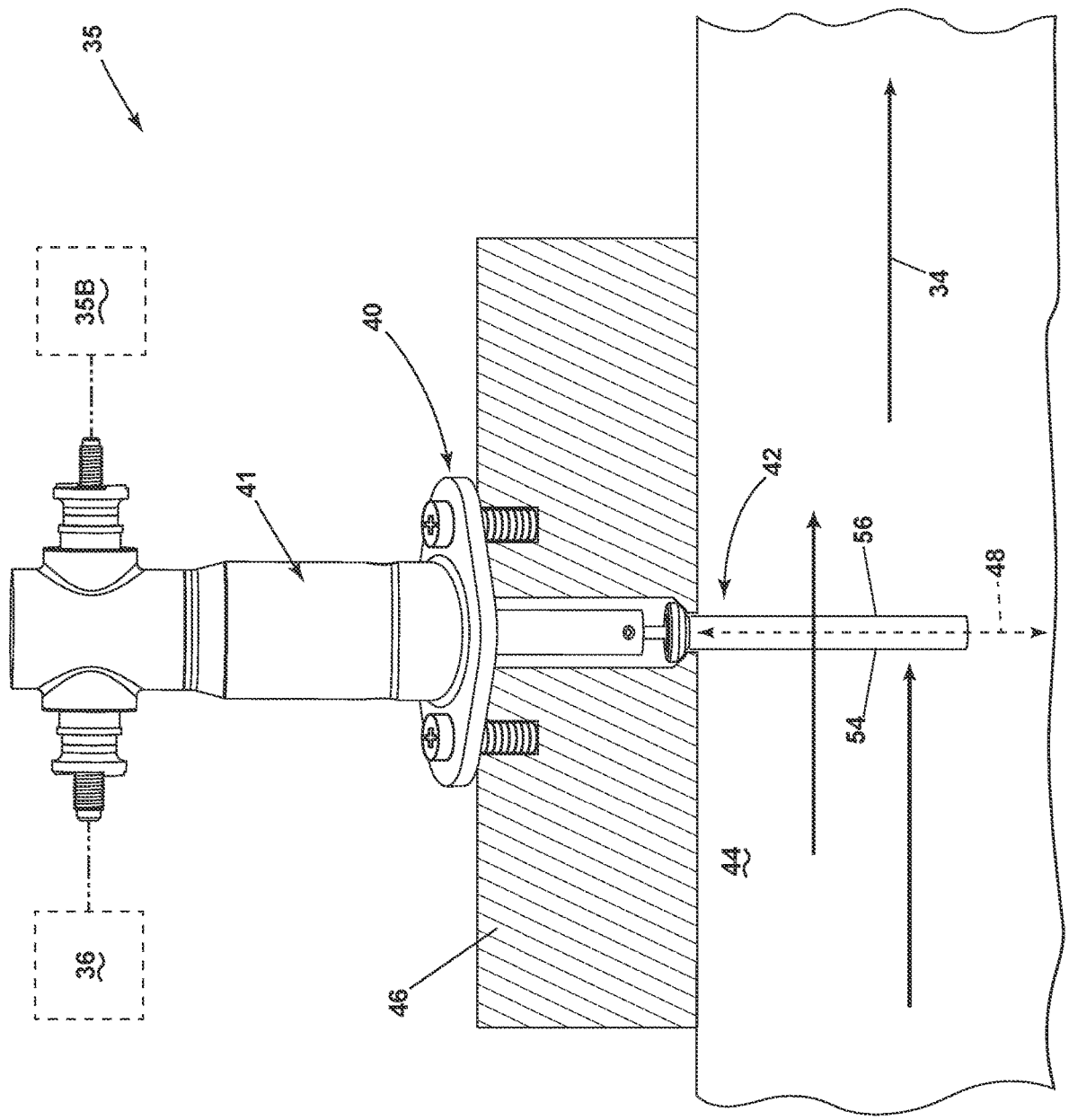
FIG. 2 is a partial cross-sectional view of a combustion section of the gas turbine engine of FIG. 1 with an exhaust gas temperature (EGT) sensor in accordance with various aspects described herein.

FIG. 2 illustrates the EGT sensor 35 of FIG. 1. In some examples, the EGT sensor 35 can be in signal communication or communicatively coupled with other components of the engine 10. Such signal communication is illustrated in dashed line. In the illustrated example, the EGT sensor 35 is illustrated as being communicatively coupled to a second EGT sensor 35B similar to the EGT sensor 35, as well as a controller module 36. The EGT sensor 35 can be in signal communication with any suitable component within or external to the engine 10. In some examples, the controller module 36 can be configured to receive a sensed or measured temperature, or a value representative or indicative thereof, from the EGT sensor 35. The controller module 36 can also perform additional or separate functionality based upon the sensed or measured temperature. In some examples, the controller module 36 can summate, average, or merge temperatures or values received from or provided by multiple temperature sensing probe assemblies, including the EGT sensors 35, 35B.

An exhaust gas passage 44 is illustrated and can be at least partially defined by an engine wall 46 in the turbine engine 10. It should be understood that the engine wall 46 is illustrated in a schematic view, and the engine wall 46 can have any suitable thickness, geometric profile, or the like, including hollow portions, solid portions, or coupled wall segments, in some non-limiting examples. The engine wall 46 can include an interior engine wall, an exterior engine wall, a combustor liner, a high pressure turbine casing, a low pressure turbine casing, or the like, in non-limiting examples.

The EGT sensor 35 can include a housing 40 forming a first portion 41 and an elongated probe portion 42. In some examples the elongated probe portion 42 can form an element housing providing structural support for a thermocouple element. In the non-limiting example shown, the first portion 41 can be disposed outside of or external to an exhaust gas passage 44, while the elongated probe portion 42 can be disposed within or directly exposed to the exhaust gas passage 44. The EGT sensor 35 can have any suitable configuration. In some non-limiting examples, at least one of the EGT sensor 35, the first portion 41, or the elongated probe portion 42 can be supported by, coupled with, or fixed to the engine wall 46. In addition, while a single continuous engine wall 46 is illustrated, the engine wall 46 can include multiple independent or discrete walls in some examples.

The elongated probe portion 42 of the housing 40 can define an axial direction 48 as shown. The elongated probe portion 42 can extend into the exhaust gas passage 44. The combustion exhaust gases 34 can flow through the exhaust gas passage 44 and encounter the elongated probe portion 42.

Figure 3:
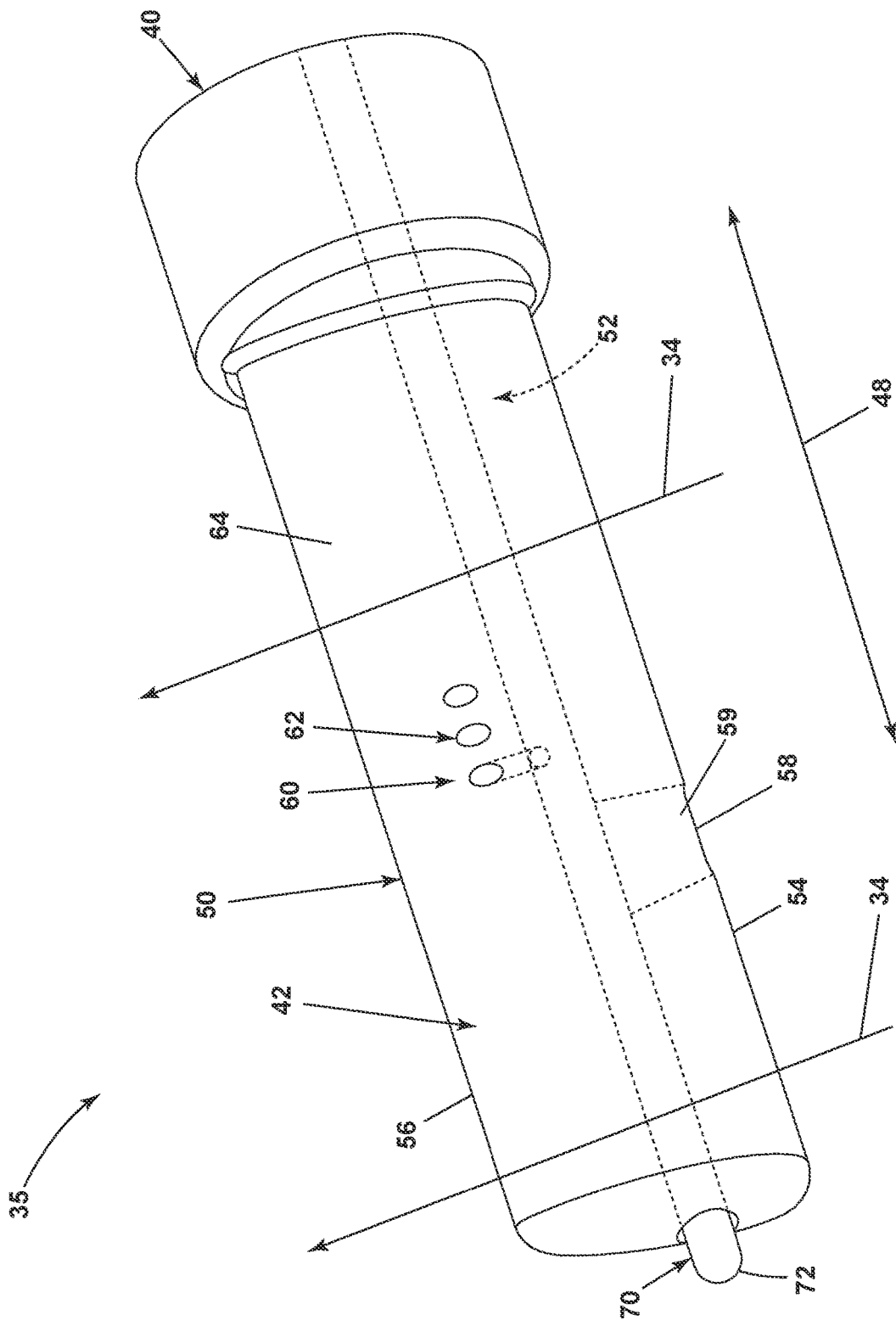
FIG. 3 is a front perspective view of the EGT sensor of FIG. 2 in accordance with various aspects described herein.

Turning to FIG. 3, the elongated probe portion 42 of the EGT sensor 35 is illustrated in further detail. An axial direction 48 can be defined along the elongated probe portion 42. The elongated probe portion 42 can include an outer wall 50 bounding an interior 52. In some examples, the outer wall 50 can have an aerodynamically-elongated geometric profile. For example, the outer wall 50 can define an airfoil cross section extending between a leading edge 54 and a trailing edge 56 though this need not be the case. The outer wall 50 can have any suitable geometry, including circular, oval, symmetric, asymmetric, or irregular, in non-limiting examples.

It is contemplated that portions of the housing 40, including the elongated probe portion 42, can include a material having a high temperature capability. As used herein, a material's "temperature capability" will refer to the highest operating temperature contemplated for use for that material, wherein subjecting the material to temperatures higher than its temperature capability can cause effects such as oxidation, fatigue, plastic deformation, or melting of the material. In some examples, the elongated probe portion 42 can have a temperature capability between −56.7° C. and 1287.8° C., including between 50° C.-1280° C. In some examples, the elongated probe portion 42 can be made of a ceramic matrix composite (CMC), refractory metal, platinum, grain stabilized platinum, nickel based superalloy, cobalt based superalloy, ceramic, monolithic ceramic, combinations thereof, and the like.

The outer wall 50 can include at least one inlet 58 and at least one outlet 60. The interior 52 of the outer wall 50 can be in fluid communication with the inlet 58 and the outlet 60. In the example shown, the inlet 58 is provided at the leading edge 54 although any inlet 58 position can be utilized. The outlet 60 can be positioned downstream of the leading edge 54. In some examples, multiple inlets 58 or multiple outlets 60 can be provided. In some examples, the inlet 58 can be spaced from the outlet 60 in the axial direction 48. In some examples, the inlet 58 and outlet 60 can align with one another in the axial direction 48. Any number of inlets 58 and outlets 60 can be provided. The inlet 58 and the outlet 60 can also have any suitable geometric profile. In the illustrated example, the inlet 58 is in the form of a slot 59 while the outlet 60 has a generally circular profile though this need not be the case. In addition, the outlet 60 can a plurality of openings on the outer wall 50. In some examples, the outlet 60 can include a first set of openings 62 on a first side 64 of the outer wall 50 and a second set of openings 66 on a second side 68 of the outer wall 50 (visible in FIG. 4). Each of the first set of openings 62 and the second set of openings 66 can be downstream of the leading edge 54.

A temperature probe 70 can be provided within the housing 40. The temperature probe 70 can extend in the axial direction 48 through the elongated probe portion 42. In the example shown, the temperature probe 70 includes a distal end 72 that is positioned outside of the housing 40 though this need not be the case. In some examples, the distal end 72 of the temperature probe 70 can be positioned fully within the interior 52 of the housing 40. The inlet 58 and outlet 60 can provide for combustion gases to reach the temperature probe 70 for measurement.

Figure 4:
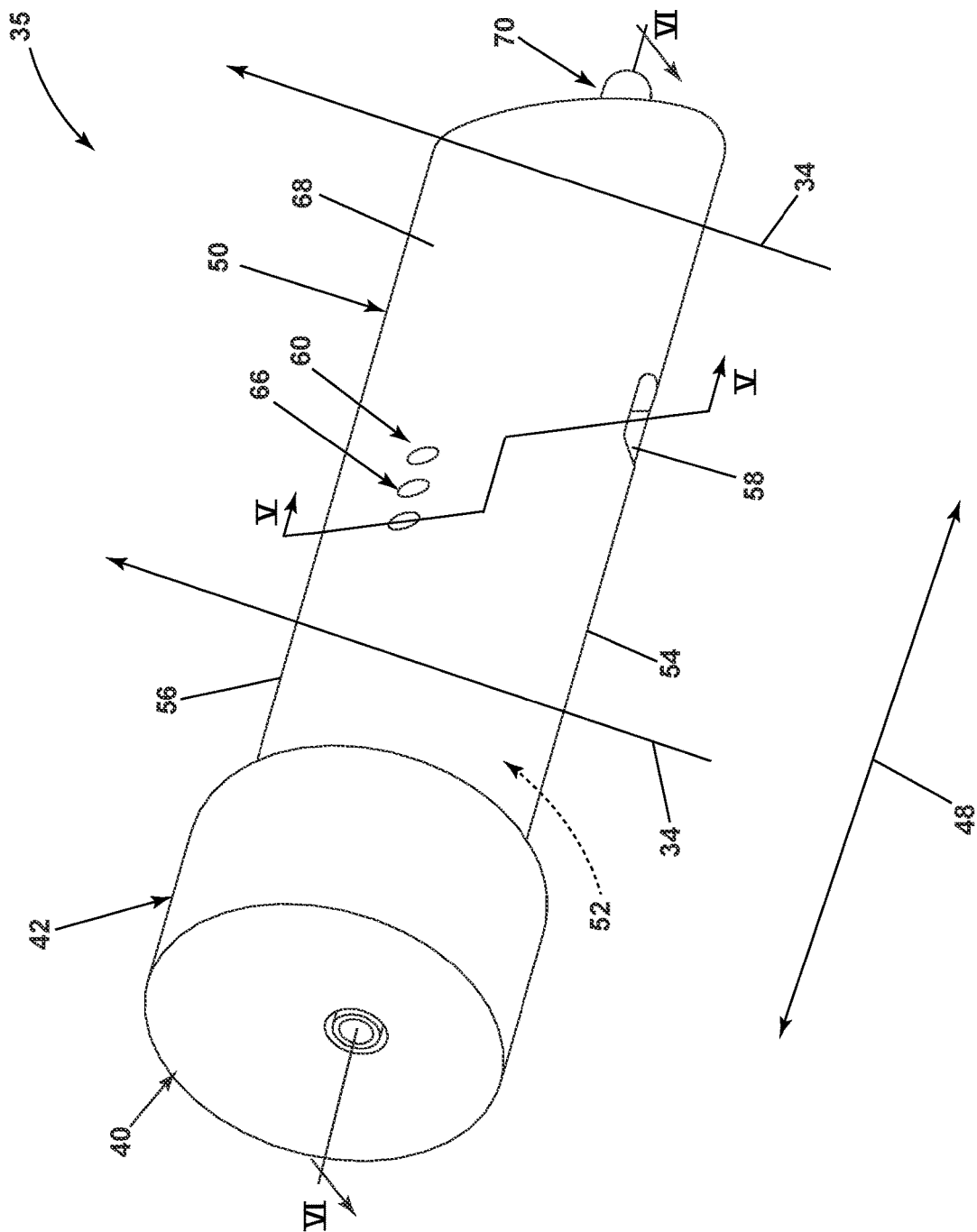
FIG. 4 is a rear perspective view of the EGT sensor of FIG. 2 in accordance with various aspects described herein.

FIG. 4 illustrates a rear perspective view of the elongated probe portion 42. In this view, the second side 68 of the outer wall 50 is visible with the second set of openings 66. While illustrated with outlets 60 on opposing sides of the elongated probe portions 42, any positioning for the outlets 60 can be utilized.

Figure 5:
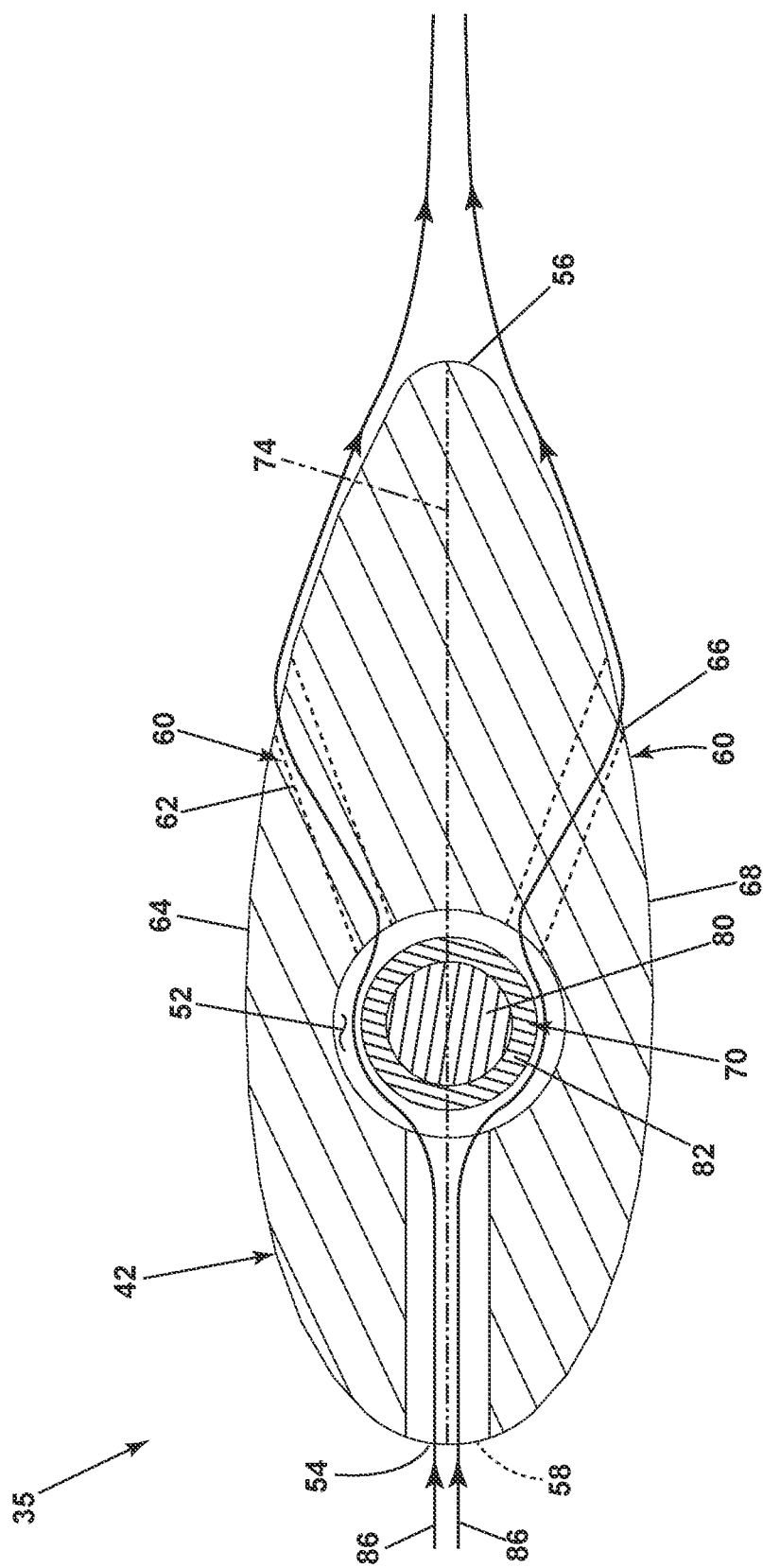
FIG. 5 is a cross-sectional view of the EGT sensor of FIG. 4 along line V-V.

Referring now to FIG. 5, a cross-sectional view of the elongated probe portion 42 is illustrated along the line V-V. The outer wall 50 can also define a chord line 74 between the leading edge 54 and the trailing edge 56. In some examples, the outer wall 50 can be symmetric about the chord line 74.

The temperature probe 70 can further include a sensor wire 80 configured to sense or detect a temperature of the combustion exhaust gases 34. In some examples, a sheath 82 can be provided surrounding the sensor wire 80. The sheath 82 can be spaced from the outer wall 50 of the housing 40.

The temperature probe 70, including either or both of the sensor wire 80 or sheath 82 can include a material with a high temperature capability. In some examples, the sensor wire 80 or the sheath 82 can have a temperature capability between −56.7° C. and 1287.8° C., including between 50° C. and 1280° C. In some examples, the sensor wire 80 or sheath 82 can include at least one of a refractory metal, platinum, ceramic, monolithic ceramic, and ceramic matrix composite.

An exhaust gas flow path 86 can pass through the interior 52 of the elongated probe portion 42 extending between the inlet 58 and the at least one outlet 60. In the illustrated example, combustion exhaust gases 34 are shown flowing along the exhaust gas flow path 86 from the inlet 58 to the outlets 60 and encountering the temperature probe 70. The exhaust gas flow path 86 can be at least partially defined between the sheath 82 and the outer wall 50 in some examples. In this manner, the temperature probe 70 can be thermally coupled to the exhaust gas flow path 86. In some examples, the temperature probe 70 can be directly exposed to the exhaust gas flow path 86. In some examples, the distal end 72 can extend outside of the housing 40 and encounter combustion exhaust gases 34, wherein the temperature probe 70 can be thermally coupled to the exhaust gas flow path 86 exteriorly of the housing 40. In addition, the exhaust gas flow path 86 can divide between the first set of openings 62 and the second set of openings 66 downstream of the inlet 58.

Figure 6:
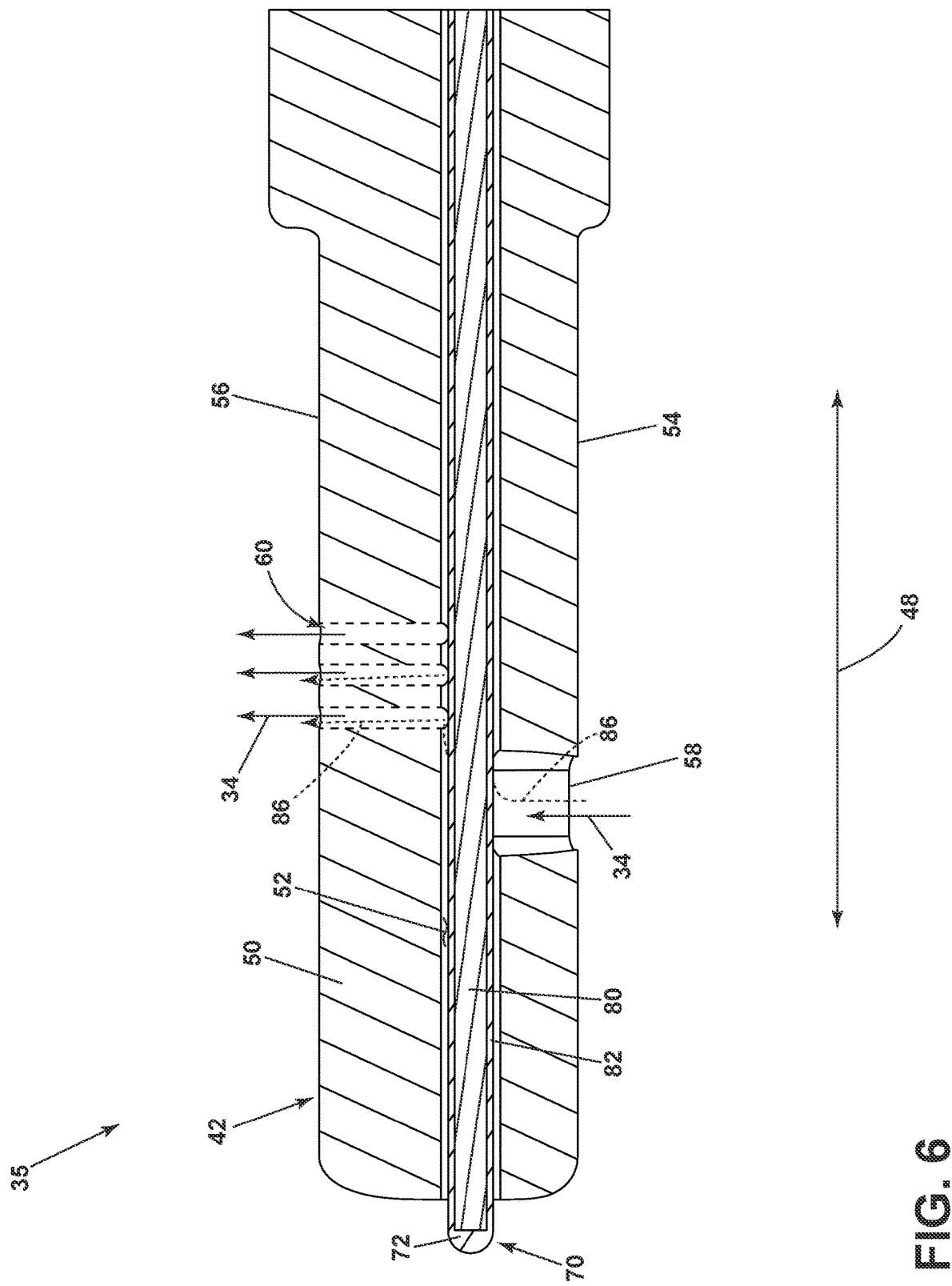
FIG. 6 is a cross-sectional view of the EGT sensor of FIG. 4 along line VI-VI.

FIG. 6 illustrates a cross-sectional view of the elongated probe portion 42 along the line VI-VI. During operation, combustion exhaust gases 34 can enter the housing 40 through the inlet 58, flow past the temperature probe 70 between the temperature probe 70 and the outer wall 50, and exit the housing 40 through the at least one outlet 60. In the example shown, the inlet 58 is spaced in the axial direction 48 from the outlet 60 though this need not be the case. Furthermore, in the example shown, the temperature probe 70 is spaced from the outer wall 50 with a constant spacing distance or gap along the entire elongated probe portion 42. It will be understood that portions of the temperature probe 70 can be abutting or coupled to the outer wall 50 with no spacing, or that a variable spacing can be formed between the temperature probe 70 and outer wall 50, in some non-limiting examples.

The above described aspects provide for an improved EGT sensor having multiple benefits. The elongated geometric profile of the sensor housing can greatly reduce aerodynamic stresses on the disclosed EGT sensor as well as reduce a coefficient of drag for the EGT sensor. In some non-limiting examples, a reduction in component stress between 400% and 750% was measured for the disclosed EGT sensor with elongated housing compared to a traditional EGT sensor. In other non-limiting examples, a coefficient of drag for the disclosed EGT sensor was between 0.15 and 0.6, compared to between 0.3 and 1.2 for a traditional EGT sensor. In still other non-limiting examples, a reduction in drag load of 100% was measured for the disclosed EGT sensor compared to a traditional EGT sensor. Such a reduction in aerodynamic stress can also reduce additional heating of the EGT sensor due to fluid flow impingement, which can decrease component wear, increase part lifetimes, and improve sensor accuracy.

In addition, the reduction in aerodynamic drag of the sensor housing can decrease a pressure drop in the combustion gas flow. Such a reduction in pressure drop can increase the efficiency of the turbine engine during operation, as the disclosed EGT sensor housing can provide for minimal disturbance of the combustion gas flow while maintaining temperature sensing or detection performance.

Still further, the elongated or streamlined sensor housing can have a increased centroidal moment of inertia compared to traditional EGT sensor housings. In one non-limiting example, the centroidal moment of inertia for the disclosed EGT sensor was increased by over 850% compared to a traditional EGT sensor. It should be appreciated that such an increase in the EGT sensor's moment of inertia can provide for greatly reduced stresses in the EGT sensor during operation.

In addition, the use of high-temperature-capability materials in the improved EGT sensor can provide for additional robustness against the hot environment within or directly adjacent the combustor. The improved heat tolerance or robustness from either or both of the elongated housing or high-temperature-capability materials can also provide for positioning the disclosed EGT sensor closer to the combustion chamber compared to traditional EGT sensors. A closer sensor positioning can further improve gas temperature measurement accuracy. In some examples, the disclosed EGT sensor can be coupled to the combustor liner for direct temperature measurement within the combustion chamber. In some examples, the disclosed EGT sensor can be positioned directly adjacent or downstream of the combustor.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A gas turbine engine, comprising a compressor section, combustion section, and turbine section in serial flow arrangement, with at least one of the combustion section or turbine section having an exhaust gas passage through which combustion exhaust gas flows; and an exhaust gas temperature sensor comprising a housing with an elongated probe portion defining an axial direction and having an outer wall bounding an interior and defining an airfoil cross section extending from a leading edge to a trailing edge, with the elongated probe portion comprising a material with a temperature capability between 50° C. and 1280° C.; an exhaust gas flow path through the interior of the elongated probe portion and extending between an inlet in the outer wall at the leading edge and an outlet in the outer wall downstream of the leading edge, with the interior of the elongated probe portion in fluid communication with the inlet and the outlet; and a temperature probe within the housing and thermally coupled to the exhaust gas flow path.

The gas turbine engine of any preceding clause, wherein the temperature probe is directly exposed to the exhaust gas flow path.

The gas turbine engine of any preceding clause, wherein the material comprises at least one of ceramic matrix composite, refractory metal, platinum, grain stabilized platinum, nickel based superalloy, cobalt based superalloy, ceramic, or monolithic ceramic.

The gas turbine engine of any preceding clause, wherein the inlet comprises a slot.

The gas turbine engine of any preceding clause, wherein the outlet comprises a plurality of openings on the outer wall.

The gas turbine engine of any preceding clause, wherein the plurality of openings comprises a first set of openings on a first side of the outer wall.

The gas turbine engine of any preceding clause, wherein the plurality of openings comprises a second set of openings on a second side of the outer wall.

The gas turbine engine of any preceding clause, wherein the first set of openings and the second set of openings are positioned downstream of the leading edge.

The gas turbine engine of any preceding clause, wherein the exhaust gas flow path divides between the first set of openings and the second set of openings downstream of the inlet.

The gas turbine engine of any preceding clause, wherein the inlet is spaced from the outlet in the axial direction.

The gas turbine engine of any preceding clause, wherein the outer wall defines a chord line between the leading edge and trailing edge, with the outer wall being symmetric about the chord line.

The gas turbine engine of any preceding clause, wherein the exhaust gas temperature sensor further comprises a sensor wire and a sheath surrounding the sensor wire.

The gas turbine engine of any preceding clause, wherein the sheath is spaced from the outer wall of the housing to at least partially define the exhaust gas flow path through the interior.

The gas turbine engine of any preceding clause, wherein at least one of the sensor wire or the sheath comprises a material with a temperature capability between 50° C. and 1280° C.

The gas turbine engine of any preceding clause, wherein at least one of the sensor wire or the sheath comprises at least one of ceramic matrix composite, refractory metal, platinum, grain stabilized platinum, nickel based superalloy, cobalt based superalloy, ceramic, or monolithic ceramic.

The gas turbine engine of any preceding clause, wherein the sensor wire comprises platinum.

The gas turbine engine of any preceding clause, wherein the sheath comprises at least one of ceramic or ceramic matrix composite.

The gas turbine engine of any preceding clause, wherein an end of the temperature probe is positioned outside of the housing.

The gas turbine engine of any preceding clause, wherein the exhaust gas temperature sensor is coupled to a combustor liner of the combustor.

The gas turbine engine of any preceding clause, wherein the exhaust gas temperature sensor is positioned directly adjacent the combustor.

An exhaust gas temperature sensor, comprising a housing with an elongated probe portion comprising at least one of ceramic, monolithic ceramic, or ceramic matrix composite and defining an axial direction, with the elongated probe portion having an outer wall bounding an interior and defining an airfoil cross section extending from a leading edge to a trailing edge, an exhaust gas flow path through the interior of the elongated probe portion and extending between an inlet in the outer wall at the leading edge and an outlet in the outer wall downstream of the leading edge, with the interior of the elongated probe portion in fluid communication with the inlet and the outlet, and a temperature probe within the housing and thermally coupled to the exhaust gas flow path.

The exhaust gas temperature sensor of any preceding clause, wherein the temperature probe is directly exposed to the exhaust gas flow path.

The exhaust gas temperature sensor of any preceding clause, wherein the inlet comprises a slot and the outlet comprises a plurality of openings on the outer wall.

The exhaust gas temperature sensor of any preceding clause, wherein the plurality of openings comprises a first set of openings on a first side of the outer wall and a second set of openings on a second side of the outer wall.

The exhaust gas temperature sensor of any preceding clause, wherein the first set of openings and the second set of openings are positioned downstream of the leading edge.

The exhaust gas temperature sensor of any preceding clause, wherein the inlet is spaced from the outlet in the axial direction.

The exhaust gas temperature sensor of any preceding clause, wherein an end of the temperature probe is positioned outside of the housing.

The exhaust gas temperature sensor of any preceding clause, wherein the outer wall defines a chord line between the leading edge and trailing edge, with the outer wall being symmetric about the chord line.

A gas turbine engine, comprising a compressor section, combustion section, and turbine section in serial flow arrangement, with at least one of the combustion section or turbine section having an exhaust gas passage through which combustion exhaust gas flows; and an exhaust gas temperature sensor comprising a housing with an elongated probe portion defining an axial direction and having an outer wall bounding an interior and defining an airfoil cross section extending from a leading edge to a trailing edge, with the elongated probe portion comprising at least one of ceramic, monolithic ceramic, or ceramic matrix composite; an exhaust gas flow path through the interior of the elongated probe portion and extending between an inlet in the outer wall at the leading edge and an outlet in the outer wall downstream of the leading edge, with the interior of the elongated probe portion in fluid communication with the inlet and the outlet; and a temperature probe within the housing and thermally coupled to the exhaust gas flow path.

An exhaust gas temperature sensor, comprising a housing with an elongated probe portion defining an axial direction and having an outer wall bounding an interior and defining an airfoil cross section extending from a leading edge to a trailing edge, with the elongated probe portion comprising a material with a temperature capability between 50° C. and 1280° C.; an exhaust gas flow path through the interior of the elongated probe portion and extending between an inlet in the outer wall at the leading edge and an outlet in the outer wall downstream of the leading edge, with the interior of the elongated probe portion in fluid communication with the inlet and the outlet, and a temperature probe within the housing and thermally coupled to the exhaust gas flow path.

What is claimed is:

1. A gas turbine engine, comprising:
   a compressor section, combustion section, and turbine section in serial flow arrangement, with at least one of the combustion section or turbine section having an exhaust gas passage through which combustion exhaust gas flows; and
   an exhaust gas temperature sensor in the exhaust gas passage, the exhaust gas temperature sensor comprising:
      a housing with an elongated probe portion defining an axial direction and having an outer wall bounding an interior extending along the axial direction and defining an interior dimension sized to receive a temperature probe, the outer wall defining an airfoil cross section extending from a leading edge to a trailing edge, with the elongated probe portion comprising a material with a temperature capability between 50° C. and 1280° C., and wherein the outer wall defines a chord line extending from the leading edge to the trailing edge, and wherein a first length extends along the chord line between the leading edge and the interior;
      an exhaust gas flow path through the interior of the elongated probe portion and extending between an inlet in the outer wall at the leading edge and an outlet in the outer wall downstream of the leading edge, with the interior of the elongated probe portion in fluid communication with the inlet and the outlet, wherein a portion of the exhaust gas flow path extends from the inlet to the interior along the first length; and the temperature probe within the housing and thermally coupled to the exhaust gas flow path;

wherein the airfoil cross section of the housing defines a centroidal moment of inertia configured to reduce stresses on the temperature probe from the combustion exhaust gas; and wherein the first length of the outer wall between the leading edge and the interior is larger than the interior dimension sized to receive the temperature probe.

2. The gas turbine engine of claim 1, wherein the temperature probe is directly exposed to the exhaust gas flow path.

3. The gas turbine engine of claim 1, wherein the inlet comprises a slot and the outlet comprises a plurality of openings on the outer wall.

4. The gas turbine engine of claim 3, wherein the plurality of openings comprises a first set of openings on a first side of the outer wall and a second set of openings on a second side of the outer wall.

5. The gas turbine engine of claim 4, wherein the first set of openings and the second set of openings are positioned downstream of the leading edge.

6. The gas turbine engine of claim 1, wherein the inlet is spaced from the outlet in the axial direction.

7. The gas turbine engine of claim 1, wherein the outer wall defines a chord line between the leading edge and trailing edge, with the outer wall being symmetric about the chord line.

8. The gas turbine engine of claim 1, wherein the exhaust gas temperature sensor further comprises a sensor wire and a sheath surrounding the sensor wire, with the sheath spaced from the outer wall of the housing to at least partially define the exhaust gas flow path through the interior.

9. The gas turbine engine of claim 1, wherein an end of the temperature probe is positioned outside of the housing.

10. The gas turbine engine of claim 1, wherein a second length between the trailing edge and the interior is larger than the interior dimension sized to receive the temperature probe.

11. The gas turbine engine of claim 10, wherein an axial cross section of the outer wall contiguously extends along the first length and along the second length.

12. The gas turbine engine of claim 1, wherein interior is cylindrical-shaped and defining a diameter, and wherein the first length between the leading edge and the interior is larger than the interior diameter.

13. An exhaust gas temperature sensor in an exhaust gas passage, the exhaust gas temperature sensor, comprising:

a housing with an elongated probe portion comprising at least one of ceramic, monolithic ceramic, or ceramic matrix composite and defining an axial direction, with the elongated probe portion having an outer wall bounding an interior extending along the axial direction and sized to receive a temperature probe, the outer wall defining an airfoil cross section extending from a leading edge to a trailing edge, wherein the housing defines a first length extending from the leading edge to the interior;

an exhaust gas flow path through the interior of the elongated probe portion and extending between an inlet in the outer wall at the leading edge and an outlet in the outer wall downstream of the leading edge, with the interior of the elongated probe portion in fluid communication with the inlet and the outlet, wherein a portion of the exhaust gas flow path extends from the inlet to the interior along the first length; and the temperature probe received within the housing and defining a diameter, the temperature probe thermally coupled to the exhaust gas flow path;

wherein the airfoil cross section of the housing defines a centroidal moment of inertia configured to reduce stresses on the temperature probe from the combustion exhaust gas; and wherein a first thickness of the outer wall between the leading edge and the interior is larger than the diameter of the temperature probe.

14. The exhaust gas temperature sensor of claim 13, wherein the temperature probe is directly exposed to the exhaust gas flow path.

15. The exhaust gas temperature sensor of claim 13, wherein the inlet comprises a slot and the outlet comprises a plurality of openings on the outer wall.

16. The exhaust gas temperature sensor of claim 13, wherein the inlet is spaced from the outlet in the axial direction.

17. The exhaust gas temperature sensor of claim 13, wherein an end of the temperature probe is positioned outside of the housing.

18. The exhaust gas temperature sensor of claim 13, wherein the outer wall defines a chord line between the leading edge and trailing edge, with the outer wall being symmetric about the chord line.

19. The exhaust gas temperature sensor of claim 13, wherein a second thickness between the trailing edge and the interior is larger than the diameter of the temperature probe.

* * * * *